United States Patent Office 3,068,308
Patented Dec. 11, 1962

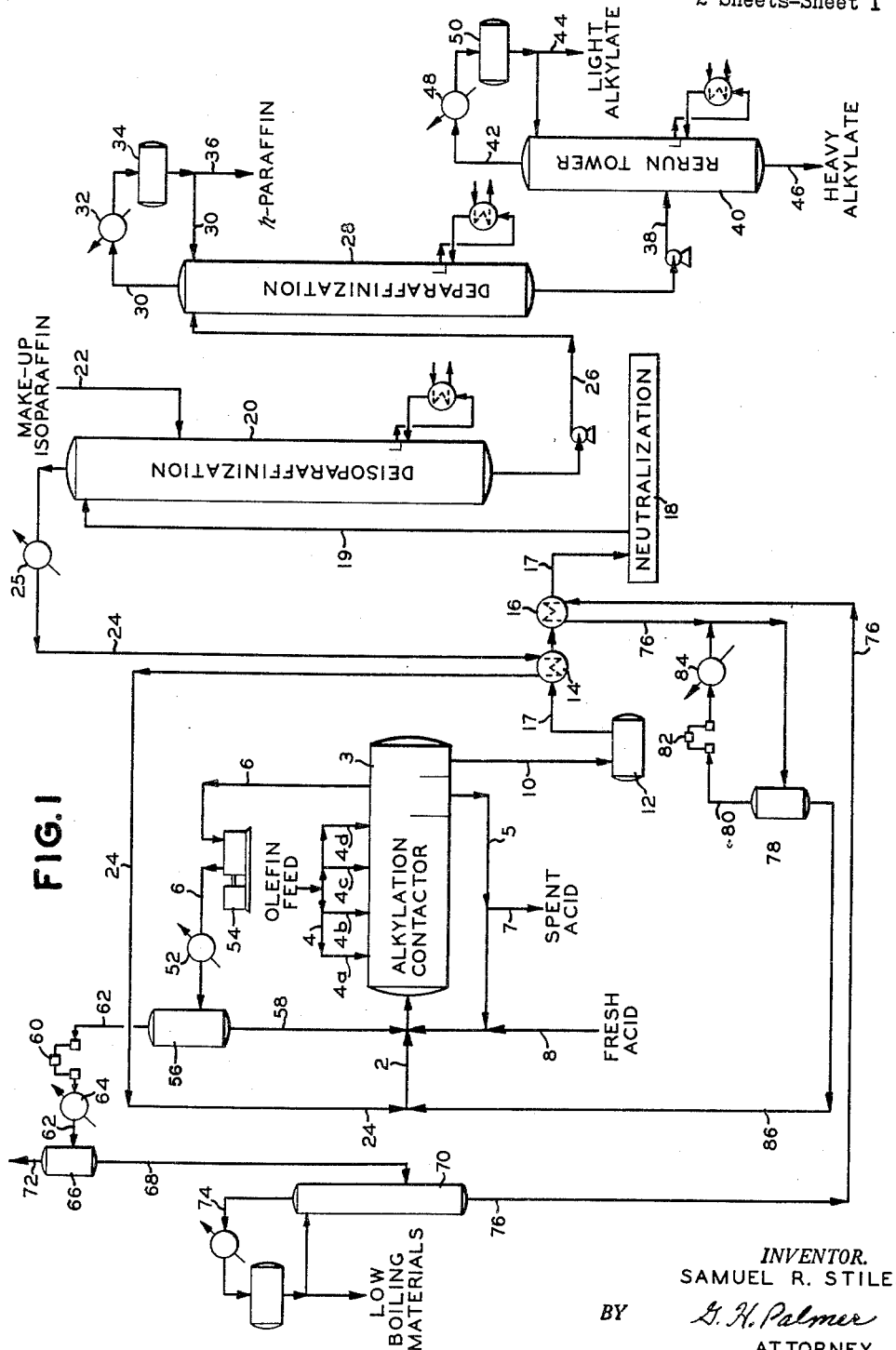

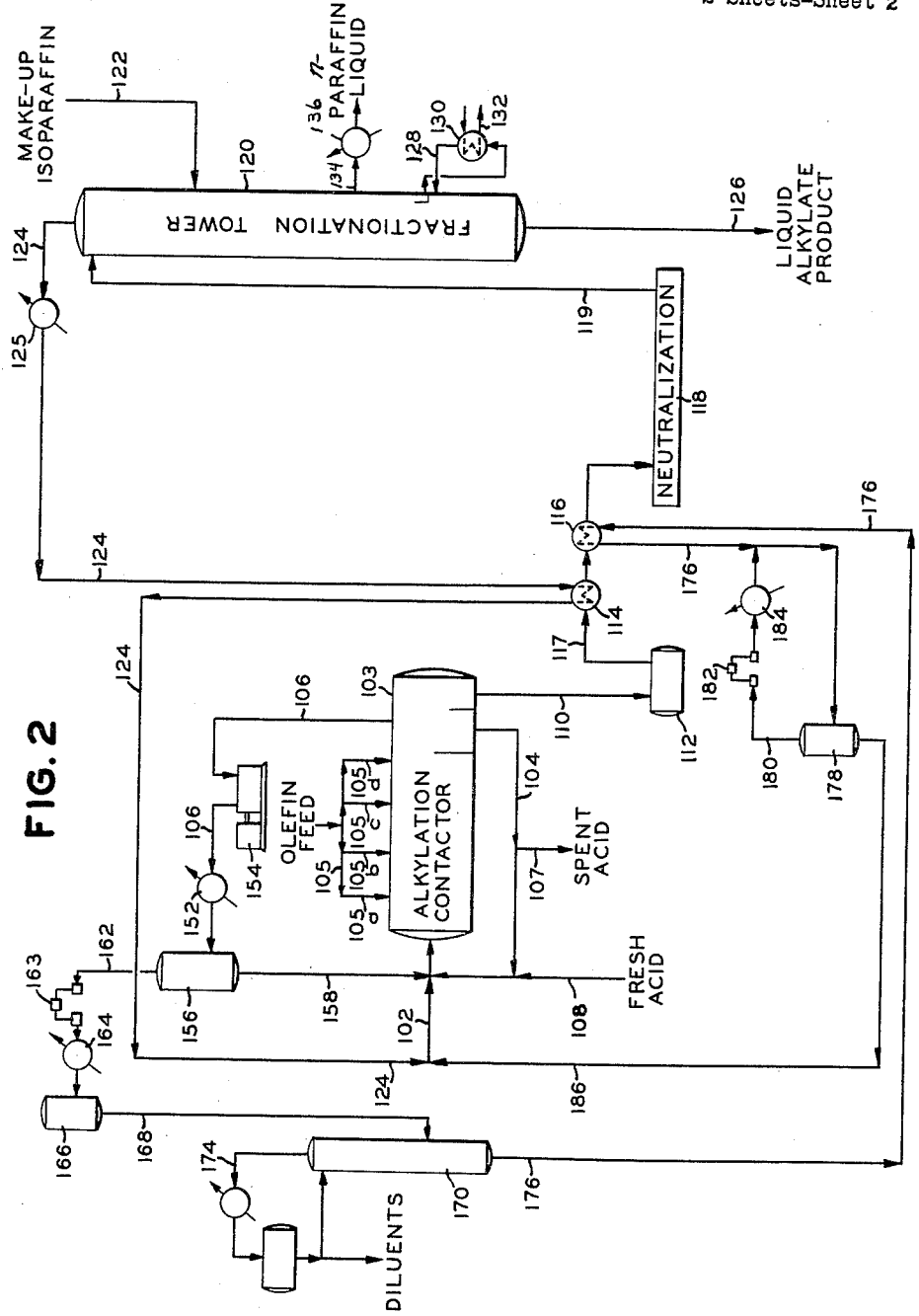

3,068,308
ALKYLATION OF HYDROCARBONS
Samuel R. Stiles, Cresskill, N.J., assignor to The M. W. Kellogg Company, Jersey City, N.J., a corporation of Delaware
Filed June 3, 1959, Ser. No. 817,799
7 Claims. (Cl. 260—683.62)

This invention relates to an improved alkylation process and more particularly to the alkylation of isoparaffins with olefins in the presence of an alkylation catalyst to produce hydrocarbon compounds boiling in the gasoline boiling range. In one aspect the invention relates to improving the efficiency and economy of an alkylation process. In other aspect the invention relates to an improved method of separating products of an alkylation reaction.

Among the various catalytic processes which have made possible and economical the production of fuels having a quality rating of better than 90 octane for both automotive and aviation use, the alkylation of hydrocarbons is of greatest importance. Of the various alkylation processes currently in use, for example, the alkylation of an olefin with an olefin, the alkylation of an aromatic compound with an olefin and the alkylation of an iso-paraffin with an olefin, the latter is by far the foremost in importance. Some reasons for this are: isoparaffins as well as olefins are converted, resulting in an increased product yield, the alkylate is essentially free from gum-forming materials so that additives are not required; the alkylate has a higher tetraethyl lead response than polymerized olefins and the performance in super-charged engines is superior to most other catalytically produced fuels.

Generally, the alkylation of an isoparaffin with an olefin involves contacting these reactants in the presence of a catalyst in an alkylation zone, removing lower boiling hydrocarbons which enter the system in the reactant feed streams, removing the crude alkylate product and treating it to neutralize and remove sulfur-bearing contaminants which are sometimes formed in the reaction zone. The treated alkylate is then deisoparaffinized and the isoparaffin removed, usually as a vapor, is condensed and recycled to the reaction zone while the deisoparaffinized alkylate mixture is removed and treated for further purification and separation.

Many chemical and engineering problems are involved in the design and operation of an efficient alkylation process. The reaction between the alkylatable hydrocarbon and olefin in the presence of an alkylation catalyst is exothermic and the heat of reaction must be removed during the reaction for maintenance of operating conditions. In addition, diluents which enter the alkylation reactor in the feed thereto must be removed from the system in order to avoid the accumulation and interference in the rate of reaction and to maintain a relatively low volume of circulation. The temperature of the reaction is controlled and the heat of reaction is removed from the alkylation reactor by vaporizing a portion of the isoparaffin rich hydrocarbon. The lighter diluents, being more volatile than the isoparaffin, are concentrated in the vapors and can be removed from the reacting system by processing these vapors.

Since it is known that the quality of the alkylate product is improved by a high concentration of the alkylatable hydrocarbon with respect to olefin in the alkylation zone during the reaction, the unreacted constituent must be efficiently and economically separated from the vaporous diluent phase for return to the reaction zone and further reaction with olefin. In this way a desirable mol ratio of alkylatable hydrocarbon to olefin is maintained. The separation of alkylatable hydrocarbon from lower boiling material is accomplished by means of distillation zones wherein the lower boiling hydrocarbon diluents are successively concentrated in the vapor streams. Since a relatively large volume of material is passed to said distillation zones from said alkylation reactor, much expense and loss of efficiency has been incurred in this stage of the process.

It is, therefore, an object of this invention to provide an improved process for the alkylation of hydrocarbons in the presence of an alkylation catalyst.

It is another object of this invention to provide a more efficient and economically feasible method of carrying out alkylation reactions.

Still another object of this invention is to provide an improved method for separating products of an alkylation reaction.

Still another object of this invention is to provide a more efficient and economical method of removing low boiling hydrocarbon diluents from an alkylation system.

Still another object of this invention is to increase the ratio of alkylatable hydrocarbon with respect to olefin in the reaction zone.

Another object of this invention is to decrease the volume of inerts in the alkylation reacting system.

Other objects and advantages of the present invention will become apparent to those skilled in the art from the following description and disclosure.

According to the process of this invention, an alkylatable hydrocarbon is reacted with an olefin in the presence of an alkylation catalyst in an alkylation contactor to produce a vaporous effluent containing unreacted alkylatable hydrocarbon and lower boiling hydrocarbons and a liquid effluent containing alkylate product. The vaporous effluent is removed from the contactor, condensed and passed to a flashing zone wherein a vaporous fraction and a liquid fraction are formed. At least a portion, and preferably all of the liquid fraction which contains concentrated alkylatable hydrocarbon is directly recycled to the alkylation contactor as a part of the alkylatable hydrocarbon feed thereto, while the vaporous fraction, wherein lower boiling diluents are concentrated, is condensed and passed to a distillation zone, together with any of the liquid fraction not returned directly to the reactor. In the distillation zone, hydrocarbons boiling below the alkylatable hydrocarbon are removed as a vapor. The alkylatable hydrocarbon is removed from the distillation zone as a liquid and is then recycled to the alkylation contactor as a part of the feed thereto.

The liquid effluent withdrawn from the contactor is treated for the removal of acid contaminants such as acid esters and the decontaminated alkylate mixture which, in the preferred reaction of the present invention, contains isoparaffin, n-paraffin and alkylate product is further treated to separately recover one or more of the above constituents of the decontaminated alkylate mixture.

A novel method of separating the above-mentioned constituents of the alkylate mixture comprises passing the liquid to a fractionation zone from which the isoparaffin is removed as a vaporous overhead fraction, the n-paraffin is removed as a vaporous side fraction and the alkylate product is removed as a liquid fraction from the bottom of the fractionation zone. Since the separation of the various constituents is carried out in a single operation, this method provides for simplification of the alkylation process with greater economy of operation.

In carrying out the above process, a pressure is maintained on the alkylation reaction at about the boiling point of the alkylatable hydrocarbon reactant at a predetermined temperature, so that the heat of reaction results in the vaporization of the lower boiling hydrocarbon constituents and a portion of the alkylatable hydrocarbon.

In this way, the reaction temperature is controlled and maintained constant by evaporative cooling and the vaporous effluent removed from the contactor is regarded as auto-refrigerant.

The liquid alkylate mixture removed from the alkylation contactor can also be treated for the removal of contaminants and the separate removal of lower boiling paraffins in separate zones, after which, the alkylate product is recovered as a product of the process or may be further treated by fractionation into light and heavy fractions for use in specific applications, such as, for example, aviation gasoline.

The process of the present invention is applicable to all alkylation processes involving the reaction between an alkylatable hydrocarbon and an olefin in the presence of a catalyst. However, the preferred process involves the reaction between an isoparaffin and an olefin in the presence of a liquid acid catalyst. The isoparaffins which may be used include: isobutane, isopentane, isohexane, etc., or mixtures thereof and the olefins reacted with these isoparaffins include: ethylene, propylene, butylene, pentylene, and olefinic isomers and dimers, trimers, tetramers and mixtures thereof. It is also within the scope of this invention to utilize any proportion of the above as feed stocks and, in addition, mixtures of isoparaffins and olefins in the presence or absence of n-paraffins.

A wide variety of catalysts are available for use in the alkylation of an isoparaffin (an alkylatable hydrocarbon) with an olefin. Among the catalysts included within the scope of this invention are mineral acids such as sulfuric acid, hydrofluoric acid, phosphoric acid, chlorosulfonic acid, fluorosulfonic acid, etc., which may be used either singly or in admixture. Non-solid Friedel-Crafts catalysts which form a liquid phase substantially immiscible with the hydrocarbon phase may also be employed. These include the conventional Friedel-Crafts metallic halides, such as, aluminum chloride, in an acid such as those just enumerated and metallic halide-hydrocarbon complexes. Other liquid catalyst which provide a heterogeneous reaction mixture with the alkylatable hydrocarbon may also be employed within the scope of this invention.

When alkylating an aromatic compound such as benzene with an olefin, or example, ethylene or propylene, the reaction is carried out in the presence of a catalyst such as those enumerated above. However, the preferred catalysts include those of the Friedel-Crafts type and phosphoric acid or salts of phosphoric acid such as pyrophosphoric acid. The most preferred reaction of the present invention involves the reaction between isobutane and an olefin in the presence of a sulfuric acid or hydrofluoric acid catalyst.

Generally, the alkylation reaction takes place over a wide range of temperature and pressure, ranging from about −50° F. to about 500° F. and from about 0 p.s.i.g. to about 1000 p.s.i.g. However, the preferred reaction of the present invention is preferably carried out at a temperature of between about 25° F. and about 100° F., and a pressure of from about 0 p.s.i.g. to about 100 p.s.i.g. To establish favorable conditions for the production of high octane alkylate in high yields, it is desirable to contact the reactants, in a plurality of zones, with vigorous agitation so as to provide uniform mixture of the reactants and, to maintain at the point of contact, a high concentration of alkylatable hydrocarbon as compared to olefin. This can be accomplished by introducing olefinic hydrocarbons into an emulsified stream of alkylatable hydrocarbons and acid which is moving past the point of olefin introduction at a high or maximum velocity.

Isobutane in sulfuric acid, for example, has a limited solubility and since the reaction of isobutane with olefins takes place in the acid phase with the acid catalyzing the reaction, the diffusion rates of isobutane passing from the hydrocarbon phase to the acid phase and into solution in the acid phase is controlling. In a similar manner, the alkylate products pass out of the acid phase and into the hydrocarbon phase; olefin solubility is extremely high in the acid and reacts directly with the acid. As a result of these factors, rapid recirculation of emulsion past a point olefin injection within the reactor, provides a specific unit volume of acid emulsion to olefins for a short period of time ($dt$) and this volume of emulsion is momentarily saturated with olefin which reacts with the isobutane, thus decreasing the isobutane availability. Recovery, or resaturation, of this volume with isobutane is completed before this unit volume is recontacted with olefins. The time required depends on the diffusion rates. This factor is a basic factor in this type of liquid-liquid reaction system and is expressed by the following correlation:

$$A_f = \frac{VE}{O} \cdot \frac{V}{R} C_m \sqrt{\frac{I}{A}}$$

wherein, $A_f$ is the quality factor of the alkylate resulting from conditions present in the acid phase listed below;
$V$ is the volume of emulsion;
$E$ is the acid concentration by volume of the emulsion;
$O$ is the olefin feed rate in barrels per hour;
$R$ is the emulsion recycle rate in barrels per second;
$C_m$ is the system diffusion constant;
$I$ is the isobutane concentration in the hydrocarbon phase; and
$A$ is the alkylate concentration in the hydrocarbon phase.

By the following expressions it is possible to calculate the space velocity and intervals at which olefin is injected into a given volume of emulsion.

$VE/O$ is equal to the space velocity in the reactor,
$V/R$ is equal to the time between olefin injections into the emulsion.

In the operation of the present invention, the volume per volume ratio of isoparaffin to acid is generally between about 2:1 and about 15:1 and the ratio of isoparaffin to olefin feed in a reaction zone falls within the range of from about 2:1 mols to about 150:1 mols in the reactor. At the point of contact, the isoparaffin to olefin ratio can be as high as 1000:1. Prior art processes have shown that mol ratios of up to about 10:1 or less isoparaffin to olefin are commonly used; however, by the process of the present invention, as hereinafter described, it is possible to achieve a higher molar excess of alkylatable hydrocarbon or isoparaffin in the alkylation zone resulting in a higher quality alkylate product.

The major portion of the isoparaffin present in the reactor is preferably provided by a recycle stream obtained from a subsequent distillation step, namely, the deisoparaffinization step, and from the auto-refrigerant stream as hereinafter described; although, a major portion of isoparaffin may be continuously supplied from an outside source, if desired. Normally, a portion of the isoparaffin is introduced into the contactor with the olefin reactant and a second portion is emulsified with the catalyst prior to contact with olefin. However, it is also within the scope of this invention to introduce the entire isoparaffin charge with the catalyst.

It has been found that the formation of undesirable reaction by-products (esters) in the reaction zone is inversely proportional to the molar excess of isoparaffin while the formation of higher quality alkylate is directly proportional to the molar excess of isoparaffin. Therefore, mol ratios of between about 20:1 and about 150:1 isoparaffin to olefin in the reactor are preferred. The higher mol ratios of this range are obtained when operating the deisoparaffinization zone as a stripper and/or by the improvement of the present invention.

Although the present alkylation process is adaptable to any one of the numerous types of contacting apparatus employed for alkylation and may be carried out in one or more stages, the preferred apparatus and method which is particularly suited to the present process, is the cascade type reactor wherein the alkylatable hydrocarbon and acid are emulsified in each of several confined reaction zones in several stages in series and the olefin is separately introduced and is uniformly dispersed throughout the emulsion in each reaction zone. The reaction mixture passes serially through the plurality of reaction zones within the reaction section of the contactor wherein the temperature is maintained at a constant low level by vaporizing the lighter components of the reaction mixture including some of the isoparaffin reactant. The reaction mixture then enters a separation section wherein liquid and vapor phases are separated. In the separation section, the liquid catalyst, preferably an inorganic acid such as sulfuric acid, is also removed from the liquid hydrocarbon phase and a portion of the acid separated is generally recycled to the reaction section, usually after being fortified with fresh acid so as to maintain the catalyst in a highly concentrated state, for example, preferably above about 85 percent sulfuric acid.

In the process of the present invention, the liquid hydrocarbon phase which, in the preferred process contains a mixture of isoparaffin, alkylate and acid esters, when sulfuric acid is employed as the catalyst, and which may or may not contain normal butane and residual acid catalyst, can be treated to remove traces of catalyst and ester contaminants when they are present. The decontaminated alkylate mixture is then passed to a first distillation zone or a deisoparaffinization zone wherein the alkylatable hydrocarbon or isoparaffin is distilled from the alkylate mixture at a temperature between about 50° F. and about 375° F. under from about 0 p.s.i.g. to 200 p.s.i.g., preferably in an isoparaffin-olefin system at a tower bottoms temperature between about 50° F. and about 250° F. under a tower top pressure from about 0 p.s.i.g. to about 140 p.s.i.g. The concentrated alkylate can then be subjected to subsequent refinement steps such as the removal of n-paraffins, if present, and the fractionation into light and heavy alkylate fractions. The removal of acid and acid esters is accomplished by water-washing, bauxite treating, dilute caustic washing or combinations of these or other known treating steps, although the addition of caustic as a neutralizing agent followed by water-washing at an elevated temperature, is usually preferred.

The vaporous effluent in the alkylation contactor usually contains some entrained liquid which, for practical purposes should be removed before the vapors are subjected to further treatment. A convenient and efficient method of removing this liquid comprises passing the vapors through a coalescing device which, by impingement contact, removes the liquid and provides means for returning it to the liquid effluent in the contactor. It is to be understood, however, that any method of drying or removing entrained liquid from the vaporous effluent may be employed if desired without departing from the scope of this invention.

The treated vaporous effluent or auto-refrigerant is passed to a compressor wherein it is compressed to a pressure at which the vapors can be condensed by heat exchange with water or air or other cooling media, to between about atmospheric pressure and about 175 p.s.i.g., but usually to a pressure in excess of that employed in the reaction zone. The compressed vapors are then removed from the compressor and at least partially condensed. In the case of an isoparaffin-olefin alkylation system, the vapors are preferably compressed to between about atmospheric pressure and about 150 p.s.i.g., whereas in an aromatic-olefin alkylation, the vaporous effluent is preferably compressed to between about atmospheric and about 30 p.s.i.g. In certain instances, for example, where the alkylation reaction is carried out at temperatures above the available cooling media temperature, compression can be avoided and the vaporous effluent can be directly condensed with cooling media.

At least a major portion of the vapors are condensed; however, it is preferable to totally condense the vaporous effluent after compression, when compression is employed. The resulting condensed effluent together with any of the remaining vapor is then subjected to a flashing operation to produce a liquid alkylatable hydrocarbon phase and a vaporous phase, which contains the low boiling diluents or inert materials which enter the reaction zone in the feed materials. The vaporous phase is then withdrawn, condensed and passed to a second distillation zone for removal of low boiling components from the system. The flashing operation serves to concentrate the low boiling materials in the vaporous phase and to produce an alkylatable hydrocarbon liquid phase which is substantially free of the low boiling diluents. Thus, the liquid phase can be directly and continuously recycled to the alkylation zone, thereby increasing the excess of alkylatable hydrocarbon available for further reaction with olefin in the zone. By this method of operation, important process and economic advantages of the present process are realized.

The flashing zone can also be used in indirect heat exchange with alkylatable hydrocarbon recycle or olefin feed or both to cool these feeds prior to entry into the alkylation reactor. When employed as a heat exchanger, the flashing zone can also be employed to condense the vaporous overhead from the subsequent distillation zone, if desired.

Generally, the temperature and pressure conditions employed in the flashing zone are dependent upon the boiling points of the low boiling materials which are to be removed from the system and which form the vaporous phase in the flashing zone when an isoparaffin-olefin alkylation system is under consideration, a temperature of between about 25° F. and about 110° F. and a pressure of from about 30 p.s.i.g. to about 150 p.s.i.g. is preferably employed. However, it is to be understood that higher or lower temperatures or pressures may be used in accordance with the particular demands imposed by the nature of the materials undergoing separation The vaporous phase, which also contains some alkylatable hydrocarbon, is condensed or compressed and condensed and passed to a second distillation zone for the removal of low boiling diluents as a vapor from the system. The expansion which takes place in the flashing zone considerably reduces the pressure at which the resulting vapors are withdrawn and since the subsequent second distillation is generally carried out at a higher pressure, the vapor from the flashing zone is preferably compressed to a pressure consistent with that required in the following distillation. By operating in this manner, the second distillation zone is greatly reduced in size (number of trays) or fractionation load (liquid-vapor loading) since a relatively small volume of material is treated therein.

The alkylatable hydrocarbon which remains as a liquid in the second distillation zone is withdrawn and recycled to the alkylation contactor as a part of the feed thereto.

When the second distillation zone is operated at a higher temperature than the temperature employed in the contactor, the liquid from the distillation zone is first cooled and then recycled. The cooling can be accomplished in many ways, one of which includes auto-refrigerative chilling or flash chilling which is a preferred modification of the present invention. This technique involves passing the liquid from the second distillation zone to a second flashing zone, compressing and condensing the vaporous portion and admixing the condensed portion with incoming liquid. The resulting liquid portion can then be recycled to the contactor.

In the present process, where isobutane is employed as the alkylatable hydrocarbon, the following conditions are most preferred. The alkylation reaction is carried out at a temperature of between about 0° F. and about 70° F. under from about atmospheric to about 30 p.s.i.g. The vaporous effluent from the contactor is compressed to from about 50 p.s.i.g. to about 150 p.s.i.g. at a condensation temperature of about 50° F. and about 130° F. The vapor is then condensed and flashed at a temperature between about 45° F. and about 110° F. under from about 20 p.s.i.g. to about 100 p.s.i.g. and the vaporous phase from the flashing zone is distilled at between about 190° F. and about 230° F. under from about 200 p.s.i.g. to about 270 p.s.i.g.

For a better understanding of the present invention, reference is now had to the accompanying drawings, FIGURES 1 and 2. FIGURE 1 illustrates the improvement in the treatment of the auto-refrigerant by which the advantages of the present invention are obtained. In this embodiment an isoparaffin, such as isobutane, is fed into contactor 3 from line 2 and is reacted with an olefin, such as butylene, entering contactor 3 from lines 4, 4(a), 4(b), 4(c) and 4(d). The reaction is carried out at a temperature of between about 30° F. and about 70° F., under from about 5 p.s.i.g. to about 30 p.s.i.g. in the presence of an acid catalyst, for example, sulfuric acid of at least 85 percent concentration entering the contactor together with isoparaffin in line 2. Generally, the isoparaffin and the liquid catalyst are emulsified prior to contact with olefin thus providing more favorable reaction conditions and reducing the formation of undesirable by-products to a minimum. The isoparaffin-acid emulsion is reacted with the olefin by passing the emulsion serially through a plurality of reaction zones with separate introduction of olefin into each zone. During the reaction, low boiling hydrocarbons and some of the isoparaffin reactant vaporizes to form a vaporous effluent. The vaporous effluent and the unvaporized liquid effluent which contains n-paraffin, isoparaffin, alkylate, acid catalyst and acid contaminants, are passed to a separation section of contactor 3 wherein the vaporous and liquid effluents are separated. The vaporous effluent is withdrawn from the separation section by means of conduit 6.

The liquid effluent is then separated into liquid acid catalyst and a liquid hydrocarbon mixture or alkylate mixture. The acid catalyst is withdrawn from the contactor by conduit 5 and a portion of the acid is removed from the system for regeneration by means of line 7 while fresh acid is supplied to line 5 from line 8 to maintain a concentration of acid at least 85 percent.

The vaporous effluent removed from the contactor in line 6 enters the suction of compressor 54, is compressed to a pressure of from about 20 p.s.i.g. to about 150 p.s.i.g. at a condensation temperature of between about 50° F. and about 130° F. The resulting compressed vapor which is discharged from the compressor through conduit 6, is passed to water cooler 52 wherein it is condensed by indirect heat exchange with water and the condensate and any uncondensed vapors are passed to flashing zone 56. In flashing zone 56, the liquid is expanded and a pressure below the compression pressure and above the pressure in the contactor, i.e., from about 50 p.s.i.g. to about 100 p.s.i.g. at a corresponding condensation temperature of between about 25° F. and about 110° F., is maintained on the condensate in this zone. Under these conditions a vaporous portion, rich in low boiling materials, and a liquid portion of concentrated isoparaffin is produced.

The liquid portion is withdrawn from zone 56 and recycled to the alkylation contactor by means of conduits 58 and 2, whereas the vaporous portion is withdrawn by line 62 from zone 56, compressed in compressor 60 to a pressure not in excess of 300 p.s.i.g. and condensed in cooler 64 so that it can be pumped to holding drum 66 thence to distillation zone 70 by means of the line 68. Any entrained vapor is vented from drum 66 by means of vent 72.

The liquid in line 68 is pumped to distillation zone 70 wherein low boiling diluents are separated from liquid isoparaffin. The distillation zone is operated with reflux to the top of the zone in order to maintain distillation conditions and continuous separation of hydrocarbons boiling below the isoparaffin reactant. This distillation zone is maintained at a temperature of between about 50° F. and about 250° F. under from about 50 p.s.i.g. to about 300 p.s.i.g. Under these conditions, materials boiling below the isoparaffin reactant, are removed from zone 70 and the system, as a vapor, in line 74; whereas the remaining liquid, which is predominately isoparaffin, is withdrawn from zone 70 and passed in indirect heat exchange by line 76 with the liquid alkylation mixture in heat exchanger 16 as hereinafter described. The cooled liquid isoparaffin from distillation zone 70, in line 76, is then further cooled to about the temperature at which the alkylation reaction takes place by subjecting the liquid to auto-refrigerative cooling in flashing zone 78 which is provided with refrigerative cooling by withdrawing vapors in line 80, compressing the vapors in compressor 82, condensing the vapors in cooler 84 and returning the cooled liquid to line 76 entering flashing zone 78. The liquid from flashing zone 78 is then returned to the alkylation contactor as a part of the feed thereto by means of conduit 86 and 2.

The liquid hydrocarbon mixture or alkylate mixture is withdrawn from the contactor by means of line 10 and passed to coalescer 12 for removal of entrained acid. The clarified liquid is then heated by indirect heat exchange with a recycle stream in line 24 and heat exchanger 14, hereinafter described, and then in heat exchanger 16 by pumping the liquid mixture through line 17. After heating, the liquid is passed from line 17 to neutralization zone 18 wherein the liquid neutralized with caustic is washed with water at an elevated temperature to remove acidic contaminants such as sulfate esters. The neutralized liquid is then passed from line 19 to distillation zone, or deisoparaffinization zone, 20, wherein the alkylatable hydrocarbon or isoparaffin is separated from the liquid alkylate mixture as a vaporous fraction in line 24. Make-up isoparaffin feed to supply needed reacting equilibrium of isoparaffin and olefin, is also introduced into the deisoparaffinization zone from line 22. In the particular embodiment shown in the drawing, zone 20 is operated as a stripper, however, it is to be understood that one is not precluded from using a conventional reflux deisobutanization zone, if desired.

Reboiling of the deisoparaffinization zone is maintained by an external reboiler line in indirect heat exchange with steam or other heating media and the deisoparaffinization is carried out at a temperature of between about 50° F. and about 375° F. under from about 0 p.s.i.g. to about 200 p.s.i.g.

The vaporous isoparaffin fraction is then condensed in condenser 25 and the resulting liquid is passed from conduit 24 through the aforementioned indirect heat exchanger 14 in indirect heat exchange with the liquid alkylate mixture. Thereby the liquid is further cooled and recycled to the alkylation contactor as a part of the feed thereto by means of lines 24 and 2.

The deisoparaffinized alkylate mixture from zone 20 is pumped by means of line 26 to deparaffinization zone 28 wherein n-paraffin is removed from the liquid alkylate at a temperature of between about 100° F. and about 380° F. under from about 20 p.s.i.g. to about 90 p.s.i.g. The distillation conditions in zone 28 are maintained by a reboiler in indirect heat exchange with steam or other heating media. Reflux is supplied to the top of zone 28 by withdrawing vaporous n-paraffin in line 30, condensing the vapors in cooler 32 and recycling a portion of the n-paraffin from holding drum 34 to the top of tower 28. The remaining portion of liquid n-paraffin is withdrawn from the system by means of line 36 as a product of the process.

Liquid alkylate is removed from the bottom of zone 28 and pumped by means of line 38 to rerun tower 40 from which light alkylate product is recovered from line 44 and a lower boiling heavy alkylate product is recovered from line 46. Reflux is supplied to tower 40 by line 42, condenser 48 and holding drum 50 while the tower is reboiled by indirect heat exchange with steam or other heating media. The temperature and pressure conditions employed in tower 40 depend upon material undergoing fractionation and the particular desired boiling ranges of the fractions to be separated. Generally, the temperature and pressure employed in an isoparaffin-olefin system are within the range of between about 100° F. and about 450° F. and from 5 p.s.i.g. to about 25 p.s.i.g.

Referring now to FIGURE 2 of the drawing, wherein the novel treatment of auto-refrigerative vapors is combined with the novel method of separating products from the liquid alkylation mixture, it is noted that the modification of this drawing entails many of the process steps discussed above for FIGURE 1. Isoparaffin in line 102 is introduced into alkylation reactor 103 together with fortified acid catalyst from line 104 and these constituents are emulsified and contacted with olefin reactant entering the contactor from lines 105, 105(a), 105(b), 105(c) and 150(d). The reaction is carried out in a plurality of zones indicated in the drawing by various olefin feed lines and the reaction takes place in a manner identical with that set forth in FIGURE 1. Generally, vapors formed in each zone of the contactor are withdrawn from unit 103 by vapor take-off lines (not shown) and returned to the separation section of the unit for final withdrawal through line 106 after liquid entrained therewith has been removed, preferably by means of a coalescing device, (not shown). The liquid effluent is separated, in the separation section, into a liquid acid phase and a liquid alkylate mixture. The liquid acid phase is withdrawn from contactor 103, a portion thereof is removed from the system for regeneration through line 107 and the remaining portion of the acid, after being fortified with fresh acid from line 108 to maintain a desirable concentration, is recycled to the reaction section of contactor 103.

The vaporous effluent in line 106 containing diluents which enter the system in the reactant feeds is passed to compressor 154 and compressed to a pressure of from about 50 p.s.i.g. and about 150 p.s.i.g., after which the vapors are condensed in condenser 152 and thereafter pumped to flashing zone 156. In flashing zone 156, the liquid is expanded to form a liquid phase and a vaporous phase and the liquid phase is withdrawn from flashing zone 156 by means of line 158 and recycled to contactor 103 by means of line 102 as part of the isoparaffin feed thereto. The vaporous fraction in flashing zone 156 wherein the diluents or materials boiling below the alkylatable hydrocarbon are concentrated, are withdrawn from the flashing zone by conduit 162, compressed in compressor 163, and condensed in cooler 164 after which the condensate is pumped to holding drum 166. The vapors which are at a pressure of between about 50 p.s.i.g. and about 100 p.s.i.g. and a temperature of between about 25° F. and about 110° F. in flashing zone 156 are compressed to a pressure not in excess of about 300 p.s.i.g. and the condensed vapors are passed to holding drum 166. The condensate is then withdrawn from holding drum 166 by means of conduit 168 and pumped to refluxed distillation zone 170 wherein the above-described low boiling materials are removed as a vaporous fraction in line 174 from the remaining liquid isoparaffin fraction. The liquid material, which is withdrawn from zone 170 in line 176, is then passed through indirect heat exchanger 116 in indirect heat exchange with the liquid alkylate mixture, as hereinafter described, and the cooled liquid from distillation zone 170 is withdrawn from heat exchanger 116 by line 176 and passed to flashing zone 178 wherein the liquid is further cooled by auto-refrigerative chilling. This liquid is cooled to approximately the temperature employed in the alkylation contactor by removing the vaporous fraction from flashing zone 178 in line 180, compressing the vapor in compressor 182, condensing the vapor in cooler 184 and then admixing the resulting condensate with liquid entering the flashing zone through line 176. The liquid fraction from flashing zone 178 is then recycled to the contactor by means of lines 186 and 102 as part of the isoparaffin feed thereto.

The liquid alkylate mixture is withdrawn from contactor 103 through line 110 and is passed to separator 112 for further removal of residual acid catalyst and other acid material which may be entrained therewith. The acid removed from separator 112 can be recycled to the alkylation contactor in line 104 or can be preferably passed to acid withdrawal line 107, if desired. The liquid alkylate mixture is withdrawn from separator 112 by means of line 117 and pumped through indirect heat exchanger 114 in indirect heat exchange with recycle isoparaffin, hereinafter described. The liquid mixture is further heated by pumping it to heat exchanger 116 in indirect heat exchange with liquid in line 176 described above. After emerging from heat exchanger 116, the heated liquid alkylate mixture is passed to neutralization zone 118 wherein it is washed with water at a temperature of between about 140° F. and about 175° F. for removal of acid ester contaminants from the liquid alkylate mixture. Caustic is added to the water as needed to neutralize acid or acidic material extracted to prevent corrosion. The decontaminated liquid alkylate mixture is then withdrawn from the neutralization zone by line 119 and passed to fractionation zone 120 wherein the various components in the alkylate mixture are fractionated and separately recovered. For example, when the mixture comprises alkylate, isoparaffin and n-paraffin, a temperature and pressure of between about 50° F. and about 160° F. and from about 15 p.s.i.g. to about 145 p.s.i.g. is maintained in the top of the tower; a temperature of between about 60° F. and about 185° F. and a pressure of from about 20 p.s.i.g. to about 150 p.s.i.g. is maintained in the middle portion of the tower and a temperature of between about 180° F. and about 355° F. and a pressure of from about 25 p.s.i.g. to about 155 p.s.i.g. is maintained in the bottom of the tower. When the alkylate mixture contains alkylate, isobutane and n-butane, the following are representative set of conditions: tower top at 140° F. under 105 p.s.i.g.; mid tower at 165° F. under 110 p.s.i.g.; and tower bottom at 300° F. under 115 p.s.ig. Heat is supplied to tower 120 by means of at least one reboiler, in FIGURE 2 reboiler line 128, which passes through indirect heat exchanger or reboiler 130 in indirect heat exchange with steam entering reboiler 130 by line 132. It is to be understood, however, that other heat exchange media may be used in place of steam, if so desired. Fresh isoparaffin feed required to maintain the desired reacting equilibrium of isoparaffin in the contactor is also pumped into tower 120 by means of line 122 and vaporous isoparaffin is withdrawn from the top of tower 120 through conduit 124 and condensed in condenser 125; vaporous n-paraffin is withdrawn from the middle portion of the tower through line 134, condensed in cooler 136 and recovered as a product of the process and liquid alkylate product is recovered from tower 120 by line 126. The liquid alkylate product can be subjected to further treatment such as separation into fractions having certain specific boiling points, if desired or required, for particular applications. The liquid n-paraffin product can be further purified or sent to disposal, if desired.

The liquid isoparaffin fraction in conduit 124 is then further cooled by passing said vapors through indirect heat exchanger 114 in indirect heat exchange with the liquid alkylate mixture, hereinabove described, and the resulting liquid isoparaffin is recycled to contactor 103 by means of lines 124 and 102 as a part of the isoparaffin feed thereto.

The following examples are offered as a better understanding of the present invention and are not to be construed as unnecessarily limiting to the scope thereof.

The examples are carried out according to the teachings of the specification and the drawings described above.

*Example 1*

In a cascade alkylation reactor, a continuous stream of sulfuric acid of about 98 percent concentration and isobutane containing about 15 percent n-butane and a smaller amount of lower boiling hydrocarbons such as propane, is introduced in a mol ratio of about 1:7 acid to isobutane. The isobutane mixture and sulfuric acid catalyst are emulsified, flashed, to initially remove low boiling materials prior to the reaction and the resulting emulsion is passed to a confined reaction zone wherein it is contacted with butylene in a mol ratio of about 25:1, isobutane:butylene.

The reaction between isobutane and butylene to form alkylate having a high octane rating takes place at about 35° F. under about 6.7 p.s.i.g. in a plurality of confined reaction zones through which the emulsion is passed. In each zone the emulsion, under vigorous agitation induced by a mechanical mixer, is contacted with butylene which is separately introduced into each zone. During the course of reaction, materials boiling below the isoparaffin and a portion of the isoparaffin are vaporized and withdrawn from the reaction zone in order to control the reaction temperature. After the reaction is completed, these vapors, together with the resulting liquid reaction product mixture, is passed to a separation zone wherein the vapors, comprising isobutane and low boiling hydrocarbons such as propane and methane are separated from the liquid phase containing isobutane, n-butane, alkylate product, sulfuric acid catalyst and small amounts of acid esters. The vapors are passed through a coalescing device which serves to remove any liquid entrained therein and return the liquid to the liquid reaction product mixture. The liquid product mixture is then passed through a wire coalescer to separate liquid acid from the liquid hydrocarbons and the coalesced liquid is allowed to settle. The acid which separates from the hydrocarbons is withdrawn and a portion thereof is fortified to about a 98 percent concentration with fresh acid and recycled to the reaction zone. The hydrocarbon liquid or alkylate product mixture is withdrawn from the reactor and is passed through a second coalescer to further separate entrained acid and sulfur-bearing impurities therefrom. The separated acid and impurities are then removed from the system for purification.

The liquid alkylate mixture is then treated in a two-stage water-wash at a temperature of about 140° F. under about 150 p.s.i.g. Caustic is added to neutralize acid released and to prevent corrosion. The liquid is then passed to a coalescing device wherein water and neutralized acidic contaminants such as sulfate esters are removed from the liquid alkylate mixture.

The decontaminated liquid alkylate mixture is then pumped to a deisobutanization zone which is operated at a bottom temperature of about 240° F. under about 105 p.s.i.g. The temperature is maintained at the bottom of the deisobutanization tower by means of steam heated reboilers. A vaporous isobutane fraction is removed from the top of the deisobutanization zone at a temperature of about 140° F., the vapor is condensed and the isobutane condensate is passed in indirect heat exchange with the liquid alkylate mixture emerging from said second coalescer to further cool said condensed isobutane. The isobutane condensate, which is cooled to about the reaction temperature in the contactor, is then directly recycled to the reaction section of the alkylation contactor to maintain the high concentration of isobutane in the reaction zone.

The liquid alkylate product removed from the lower portion of the deisobutanization zone is then passed to a debutanization tower which is operated at a bottom temperature of about 300° F. under about 75 p.s.i.g. by means of a steam reboiler. A vaporous n-butane fraction is removed from the top of the debutanization tower and is condensed, a portion being employed as reflux to said tower and the remaining portion being withdrawn as a product of the process. Liquid alkylate product is removed from the bottom of the debutanization tower and flows to an alkylate rerun tower wherein a fraction boiling between 100° F. and 338° F. or as needed to meet the desired vapor pressure and end point specifications, is separated as a vapor from a liquid fraction boiling above these temperatures. The vaporous fraction is condensed and recovered as a product of the process suitable for use as an aviation gasoline while the liquid is recovered as a heavy alkylate product of the process suitable for use in blending automotive fuel. Of the material passed to the rerun tower 95 percent is considered as light alkylate having an octane number of at least 97.5.

The vaporous effluent, or auto-refrigerant removed from the alkylation contactor at a temperature of about 35° F. under about 6 p.s.i.g. is then compressed to about 97 p.s.i.g. and a corresponding temperature of about 160° F. The resulting compressed vapors are then condensed by indirect heat exchange with water at 105° F., and flashed at a temperature at about 60° F. under about 30 p.s.i.g. to produce a vaporous phase and a liquid phase. The liquid phase is then recycled to the alkylation reaction zone at the temperature and pressure required in the contactor and aids in maintaining the high isoparaffin to olefin ratio (25:1) in the reaction zone.

The vaporous phase is recompressed to a pressure of about 110 p.s.i.g. and a corresponding temperature of 160° F. and the resulting compressed vapors are condensed at a temperature of about 105° F., after which, the condensate is pumped to a depropanization zone operated at 170° F. under about 250 p.s.i.g. A vaporous overhead fraction comprising propane and methane is withdrawn from the depropanization zone and from the system. The remaining liquid is withdrawn from the lower portion of the depropanization zone, cooled to a temperature of about 35° F. by passing the liquid in indirect heat exchange with the liquid alkylate mixture leaving said second coalescer and by further chilling in an auto-refrigeration zone. The resulting cooled liquid is then recycled to the alkylation reaction zone as a part of the isobutane feed thereto.

*Example 2*

The reaction set forth in Example 1 between isobutane and butylene in the presence of sulfuric acid and the treatment of the vaporous reactor effluent was repeated under substantially the same conditions of temperature, pressure and mol ratios. The procedure for recycling spent acid and coalescing and water-washing the liquid alkylate mixture at an elevated temperature was also repeated under substantially the same conditions set forth above. However, the decontaminated liquid alkylate mixture withdrawn from the water coalescer is passed, in the present example, to a fractionation zone which is operated at a bottom temperature of about 345° F. under 120 p.s.i.g. and a tower top temperature of about 142° F. under about 105 p.s.i.g.

A vaporous isobutane fraction is removed from the top of the fractionation zone at a temperature of about 140° F. under 100 p.s.i.g. These vapors are then condensed by heat exchange with water and the resulting liquid passed in indirect heat exchange with the liquid alkylate mixture leaving said second coalescer to further cool the liquid isobutane fraction, and recycled to the alkylation reaction zone after emulsifying with the sulfuric acid catalyst.

Another vaporous fraction is withdrawn from the middle portion of the fractionation tower at a temperature of about 167° F. under about 110 p.s.i.g. This vaporous fraction, which comprises essentially n-butane, is condensed and recovered as a product of the process. The liquid bottoms fraction, which is the alkylate product, is withdrawn at a temperature of about 300° F. or slightly above, under 115 p.s.i.g. A portion of this liquid is recovered as a product of the process while the remaining liquid portion is passed in indirect heat exchange with steam and recycled to said fractionation zone to maintain the bottom temperature therein. A very high grade alkylate product having an octane number of about 98 is recovered as the product of the process.

The invention as described herein relates to an improved method for maintaining a high excess of alkylatable hydrocarbon in an alkylation reaction zone by withdrawing a vaporous effluent from said zone, condensing the vaporous effluent and flashing the condensate and any vapors entrained therewith, to concentrate low boiling materials in a vaporous phase and alkylatable hydrocarbon, which is suitable for direct recycle to the reaction zone, in a liquid phase. The invention also relates to an improved method for separating products of an alkylation reaction which comprises the aforementioned treatment of the vaporous effluent and the treatment of the liquid alkylate mixture in a single fractionation zone from which isoparaffin, n-paraffin and alkylate product are separately removed at various points of the fractionation zone which is maintained at different temperature levels. The components which are separately removed from the fractionation zone are immediately recoverable as products of the process.

Although the above-described improvements relate particularly to the alkylation of an isoparaffin with an olefin in the presence of a liquid catalyst, it is to be understood that other types of alkylation reactions, such as the alkylation of benzene with an olefin such as propene and the alkylation of other aromatics are contemplated within the scope of this invention.

Having thus described my invention, I claim:

1. In an alkylation process which comprises reacting an isoparaffin with an olefin in the presence of a sulfuric acid catalyst at a temperature of between about 25° F. and about 100° F. under from about 0 p.s.i.g. to about 100 p.s.i.g. in a multi-zone alkylation contactor to produce therein a vaporous fraction free of sulfuric acid and sulfate ester contaminants and containing unreacted isoparaffin and a lower boiling hydrocarbon and a liquid fraction containing alkylate product, unreacted isoparaffin and acidic contaminants; separating the vaporous isoparaffin and lower boiling hydrocarbon fraction from the liquid fraction; separating the sulfuric acid catalyst from the liquid fraction; and recovering alkylate product from the treated liquid fraction as a product of the process; the improvement which comprises: compressing the vaporous fraction to a pressure between about 14.6 p.s.i.g. and about 175 p.s.i.g.; condensing the compressed vaporous fraction; passing substantially all of said condensate to a flashing zone to separate said condensate into a liquid phase consisting essentially of isoparaffin and a vaporous phase more concentrated in lower boiling materials; recycling the liquid phase to the alkylation contactor as a part of the reaction feed thereto to maintain a high molar excess of isoparaffin therein; condensing the vaporous phase to produce a second condensate; distilling substantially all of the second condensate in a distillation zone to remove hydrocarbon boiling below said isoparaffin as a vapor from the resulting second liquid isoparaffin phase; employing the second liquid isoparaffin phase as a heat exchange medium to heat said liquid fraction prior to subsequent refinement and to cool said second liquid isoparaffin phase to a temperature of between about 25° F. and about 100° F. under from about 0 p.s.i.g. to about 100 p.s.i.g.; and recycling said second liquid isoparaffin phase to said contactor as a part of the feed thereto at substantially the same conditions of temperature and pressure employed in the contactor.

2. The process of claim 1 wherein the isoparaffin is isobutane.

3. The process claim 1 wherein the olefin is butylene.

4. In an alkylation process which comprises reacting isobutane with an olefin in the presence of sulfuric acid at a temperature of between about 25° F. and about 100° F. under from about 0 p.s.i.g. to about 100 p.s.i.g. in a multi-zone akylation contactor to produce therein a vaporous fraction free of sulfuric acid and sulfate ester contaminants and containing unreacted isobutane and a lower boiling hydrocarbon and a liquid fraction containing alkylate product, unreacted isobutane and acidic contaminants; separating the vaporous isobutane and lower boiling hydrocarbon fraction from the liquid fraction; separating sulfuric acid from the liquid fraction; and recovering alkylate product from the treated liquid fraction as a product of the process; the improvement which comprises: compressing the vaporous fraction to a pressure of between about 14.6 p.s.i.g. and about 150 p.s.i.g.; condensing the compressed vaporous fraction and passing substantially all of said condensate to a flashing zone maintained at a temperature of between about 25° F. and about 110° F. under from about 30 p.s.i.g. to about 100 p.s.i.g. to separate said condensate into a liquid phase consisting essentially of isobutane and a vaporous phase more concentrated in hydrocarbons boiling below said isobutane; recycling the liquid phase to the alkylation contactor as a part of the reaction feed thereto at substantially the same temperature and pressure as employed in said contactor to maintain a high molar excess of isoparaffin therein; condensing the vaporous phase to produce a second condensate; distilling the entire second condensate in a distillation zone at a temperature of between about 50° F. and about 250° F. under a pressure of from about 50 p.s.i.g. to about 300 p.s.i.g. to remove hydrocarbon boiling below said isobutane as a vapor from the resulting second liquid isobutane phase; employing the second liquid isobutane phase as a heat exchange medium in indirect heat exchange with said liquid fraction prior to the refinement of said liquid fraction; and recycling the resulting cooled second liquid isobutane phase to said contactor as a part of the feed thereto at substantially the same conditions of temperature and pressure employed in the contactor.

5. The process of claim 4 wherein the treated liquid effluent from the contactor is distilled to remove isobutane as a vaporous fraction from the liquid alkylate; the compressed condensate in said flashing zone is flashed in indirect heat exchange with said vaporous fraction; and the vaporous fraction is recycled to the contactor as isobutane feed together with the liquid phase from said flashing zone.

6. In an alkylation process wherein an isoparaffin is reacted with an olefin in the presence of sulfuric acid as a catalyst in a multi-zone contactor under conditions such that only isoparaffin and lower boiling materials are vaporized to provide a vaporous effluent free of sulfuric acid and sulfate ester contaminants and a liquid effluent containing alkylate product, acidic contaminants, and unreacted isoparaffin, the vaporous isoparaffin and lower boiling hydrocarbon effluent is separated from the liquid effluent and condensed and the alkylate is recovered from the liquid effluent as a product of the process, the improvement which comprises: flashing the entire isoparaffin and lower boiling hydrocarbon condensate to separate said condensate into a concentrated isoparaffin liquid phase and a vaporous phase more concentrated in lower boiling hydrocarbon; recycling the concentrated isoparaffin liquid phase to the contactor as a part of the reactant feed thereto to maintain a high molar excess of isoparaffin therein; condensing the vaporous phase to produce a second condensate; distilling the entire second condensate to remove hydrocarbon boiling below said isoparaffin as a vapor from the resulting second liquid phase thus concentrated in isoparaffin; passing said second liquid phase in indirect heat exchange with the liquid effluent containing alkylate to aid in the heat requirements of further purification of the alkylate in the liquid effluent; and recycling said second liquid phase thus cooled to said contactor as a part of the feed thereto.

7. In an alkylation process which comprises reacting isobutane with butylene in the presence of sulfuric acid as a catalyst at a temperature of between about 25° F. and about 100° F. under from about 0 p.s.i.g. to about 100 p.s.i.g. in a multi-zone alkylation contactor, to produce therein a vaporous fraction substantially free of sulfuric acid and sulfate ester contaminants and containing unreacted isobutane and a lower boiling hydrocarbon and a liquid fraction containing alkylate product, unreacted isobutane, n-butane, and acidic contaminants; separating the vaporous isobutane and lower boiling hydrocarbon fraction from the liquid fraction and separating the sulfuric acid catalyst from the remaining liquid hydrocarbon mixture to produce a liquid alkylate mixture; the improvement which comprises: compressing said separated vaporous fraction to a pressure of from about 50 p.s.i.g. to about 150 p.s.i.g.; condensing said compressed vaporous fraction; passing substantially all of said condensate to a flashing zone to separate said condensate into a liquid phase consisting essentially of isobutane and a vaporous phase more concentrated in hydrocarbon boiling below said isobutane, at a temperature of between about 45° F. and about 110° F. under from about 20 p.s.i.g. to about 100 p.s.i.g.; recycling the liquid phase to the alkylation contactor as a part of the feed thereto, at substantially the same temperature and pressure employed in said contactor; compressing said vaporous phase to a pressure of between about 200 p.s.i.g. to about 270 p.s.i.g.; condensing said compressed vaporous phase to produce a second condensate; distilling said second condensate in a distillation zone at a temperature of between about 190° F. and about 230° F. under a pressure of from about 200 p.s.i.g. to about 270 p.s.i.g. to remove hydrocarbon boiling below said isobutane as a vapor from the resulting second liquid isobutane phase; decompressing said second liquid isobutane phase; employing said second liquid isobutane phase as a heat exchange medium in indirect heat exchange with said liquid alkylate mixture to heat said mixture prior to subsequent refinement thereof; and recycling said second liquid isobutane phase to said contactor as a part of the feed thereto at substantially the same temperature and pressure employed in said contactor.

References Cited in the file of this patent

UNITED STATES PATENTS

| | | |
|---|---|---|
| 2,342,364 | Parker | Feb. 22, 1944 |
| 2,397,085 | Boedeker et al. | Mar. 26, 1946 |
| 2,664,452 | Putney | Dec. 29, 1953 |
| 2,829,181 | Stiles et al. | Apr. 1, 1958 |
| 2,865,971 | Beavon | Dec. 23, 1958 |

FOREIGN PATENTS

| | | |
|---|---|---|
| 801,145 | Great Britain | Sept. 10, 1958 |

OTHER REFERENCES

Goldsby et al.: "The Oil and Gas Journal," vol. 54, No. 20, pages 104–7, September 19, 1955.